UNITED STATES PATENT OFFICE.

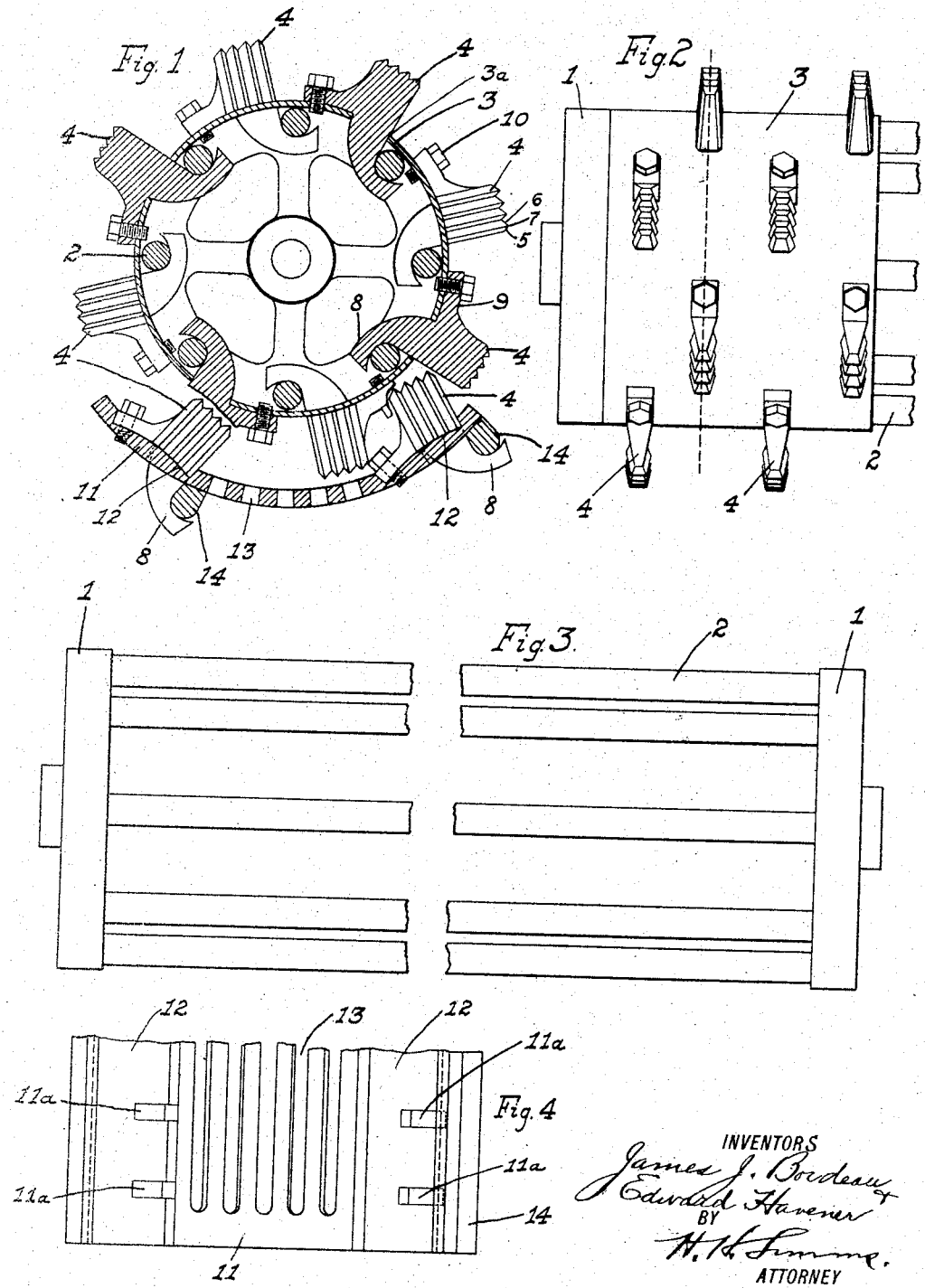
J. J. BORDEAU & E. HAVENER.
THRESHING MACHINE.
APPLICATION FILED JAN. 4, 1916.
1,203,094.
Patented Oct. 31, 1916.

JAMES J. BORDEAU AND EDWARD HAVENER, OF ROCHESTER, NEW YORK.

THRESHING-MACHINE.

1,203,094.   Specification of Letters Patent.   Patented Oct. 31, 1916.

Application filed January 4, 1916. Serial No. 70,242.

*To all whom it may concern:*

Be it known that we, JAMES J. BORDEAU and EDWARD HAVENER, of Rochester, in the county of Monroe, State of New York, have invented a new and useful Threshing-Machine, fully set forth in the following specification and shown in the accompanying drawings.

The present invention relates to threshing machines and more particularly to the construction of the cylinder and the concave, an object thereof being to provide for securing the teeth by a means operable from the side or face of the cylinder or concave from which the teeth project.

Another object of the invention is to provide a tooth which eliminates the possibility of the material passing the same without being acted upon.

To these and other ends, the invention consists in certain parts and combinations of parts all of which will be hereinafter described, the novel features being pointed out in the appended claims.

In the drawings: Figure 1 is a vertical section through the cylinder and a portion of the concave; Fig. 2 is a view of a portion of the cylinder; Fig. 3 is a detail view of the frame of the cylinder, and Fig. 4 is a detail view of a portion of the concave.

Referring more particularly to the drawings 1 indicates the two cylinder heads which are connected by a number of bars or rods 2 secured at their ends in any suitable manner to the heads. Surrounding these rods are a number of bands or rings 3 preferably having their outer faces flush with the outer faces of the heads 1 and preferably lying in abutting relation. Each of these bands is formed with a plurality of slots or openings $3^a$ for receiving the teeth 4. These teeth are preferably provided on opposite side faces and at their outer ends with corrugations, the corrugations being in the form of ribs provided by two angularly arranged faces 5 and 6 making a sharp edge or rib 7 between them. The face 5 makes a greater angle with the plane of operation of the tooth than does the face 6.

In order to secure the teeth to the cylinder, each tooth is provided with oppositely extending projections 8 and 9, the projection 8 being of less width than the tooth and being curved slightly and extending forwardly to engage with one of the rods or bars 2, the size of the projection being such that it may be passed through the opening $3^a$ to effect its engagement with the bar or rod 2. The projection 9 engages the outer face of the band 3 at that side of the opening $3^a$ in rear of the tooth, and this projection is provided with a bolt opening which receives a bolt 10. The operating head of this bolt is on the exterior of the cylinder while its other end engages screw threaded openings in the band 3.

The teeth on the concave are formed exactly like the teeth on the cylinder so that the same construction of the tooth may be used for both parts. The teeth on the concave operate between the teeth on the cylinder so that the material to be threshed will be suitably acted upon. In order to adapt the concave 11 to the teeth, the concave is provided with convex seats 12 on opposite sides of the openings 13 of the concave, the seats being engaged by the concaved under side of the teeth and being provided with openings $11^a$ through which the projections 8 are passed. On the under side, the concave is provided with short ribs 14 to one side of the openings $11^a$ for engagement by the projections 8.

According to this invention, there is provided a threshing machine having coöperating teeth on its concave and cylinder formed with roughened faces in the form of ribs or corrugations which will act on the hulls of the grain and break the hulls open, this being due to the fact that should one projection on a tooth miss the material, it will probably be caught or engaged by a successive projection. The teeth are interlocked with the cylinder and concave in such a manner that they may be attached or detached from the exposed face of the supporting part. This is due to the fact that each tooth has oppositely extending projections, one of which engages within the cylinder or the under face of the concave at one end of the tooth opening, while the other of said projections engages the exposed or outer face of the cylinder or concave at the opposite side of the tooth opening. This latter projection has an individual securing means preferably in the form of a screw bolt whose operating portion is located on the exterior of the cylinder or concave. The cylinder is of novel formation being constructed of a plurality of bands surrounding rods which connect the two heads of the cylinder, and these rods are engaged by the cylinder teeth to tie the bands to the rods. The concave has been designed for the purpose of adapting it to the novel tooth construction so that the same construction of tooth may be employed on the cylinder and the concave.

What we claim as our invention and desire to secure by Letters Patent is:—

1. A cylinder for threshing machines comprising a pair of heads, rods connecting said heads, abutting bands surrounding said rods between the heads, and teeth secured to said bands.

2. A cylinder for threshing machines comprising a pair of heads, rods connecting said heads, abutting bands surrounding said rods between the heads, and teeth secured to said bands and having portions engaging on the inner sides of said rods.

3. A cylinder for threshing machines comprising a pair of heads, rods connecting the heads, a band surrounding the rods and provided with openings, one end of each opening being adjacent to one of the rods, and teeth fitting in said openings and each having a portion engaging the rod at one end of the opening, and a portion engaging the outer face of the cylinder adjacent the opposite end of the opening, and means for securing the last named portion to the cylinder.

4. In combination with a suitable support provided with an elongated opening, of a tooth having a hooked portion with flat sides extending through and snugly fitting in said opening and engaging a portion of the support at one end of the opening, said tooth also having shoulders on opposite sides seated against said support on opposite sides of the opening, the end of the hooked portion being smaller than the base of said hooked portion and the base being substantially as large as the length of the elongated opening so that the hooked portion may be fitted in the opening by a turning movement and will snugly fit the opening at the base of the hooked portion, and means for securing the tooth to the support at that end of the opening opposite the hook engaged end.

5. In combination with a concave having convex seats on its concave face, said seats being provided with openings, teeth coöperating with said concave seats and having portions passed through said openings, and means for securing the teeth to the seats.

JAMES J. BORDEAU.
EDWARD HAVENER.